United States Patent [19]
Allen et al.

[11] Patent Number: 4,978,194
[45] Date of Patent: Dec. 18, 1990

[54] STEPPED CABLE BLOCK

[75] Inventors: Dennis Allen, San Ramon; Donald Del Fava, San Carlos; Harold D. Geesey, Belmont; Lowell I. Koht, Foster City; Mark S. McClintic, Dublin; Dean A. Newton, Fremont; Timothy L. Petro, Sr., Pleasanton, all of Calif.

[73] Assignee: Raynet Corporation, Menlo Park, Calif.

[21] Appl. No.: 399,689

[22] Filed: Aug. 28, 1989

[51] Int. Cl.$^5$ .............................................. G02B 6/44
[52] U.S. Cl. .............................. 350/96.23; 350/96.20; 350/96.21
[58] Field of Search ............... 350/96.10, 96.20, 96.21, 350/96.23

[56] References Cited

U.S. PATENT DOCUMENTS

| | | | |
|---|---|---|---|
| 4,737,010 | 4/1988 | Le Maitre et al. | 350/96.20 |
| 4,744,629 | 5/1988 | Bertoglio et al. | 350/96.20 |
| 4,746,187 | 5/1988 | Flores | 350/96.20 |
| 4,759,599 | 7/1988 | Yamaguchi et al. | 350/96.21 |
| 4,772,081 | 9/1988 | Borgos et al. | 350/96.20 |
| 4,772,087 | 9/1988 | Ito | 350/96.20 |
| 4,795,230 | 1/1989 | Garcia et al. | 350/96.20 |
| 4,801,191 | 1/1989 | Nakai et al. | 350/96.20 |
| 4,900,118 | 2/1990 | Yanagawa et al. | 350/96.21 |

*Primary Examiner*—John D. Lee
*Assistant Examiner*—Phan T. Heartney
*Attorney, Agent, or Firm*—Dennis E. Kovach

[57] ABSTRACT

A cable block for telecommunications cable includes first and second half shell members which together form a substantially cylindrical stepped longitudinal bore therethrough, portions of the bore being sealingly engaged against progressive stripped outer parts of a stripped part of the cable so as to sealingly engage against each intermediate layer thereof which could form a water channel between its adjacent cable layer. Metal pins are also provided which extend into the channel and electrically connect to a ground shield of the cable for dissipating electrical currents during current surges as can occur when lightening strikes. The cable block is useable for terminating an end of a cable or of an intermediate section thereof at which access to the telecommunications conduction media is required without breaking the conduction media.

21 Claims, 6 Drawing Sheets

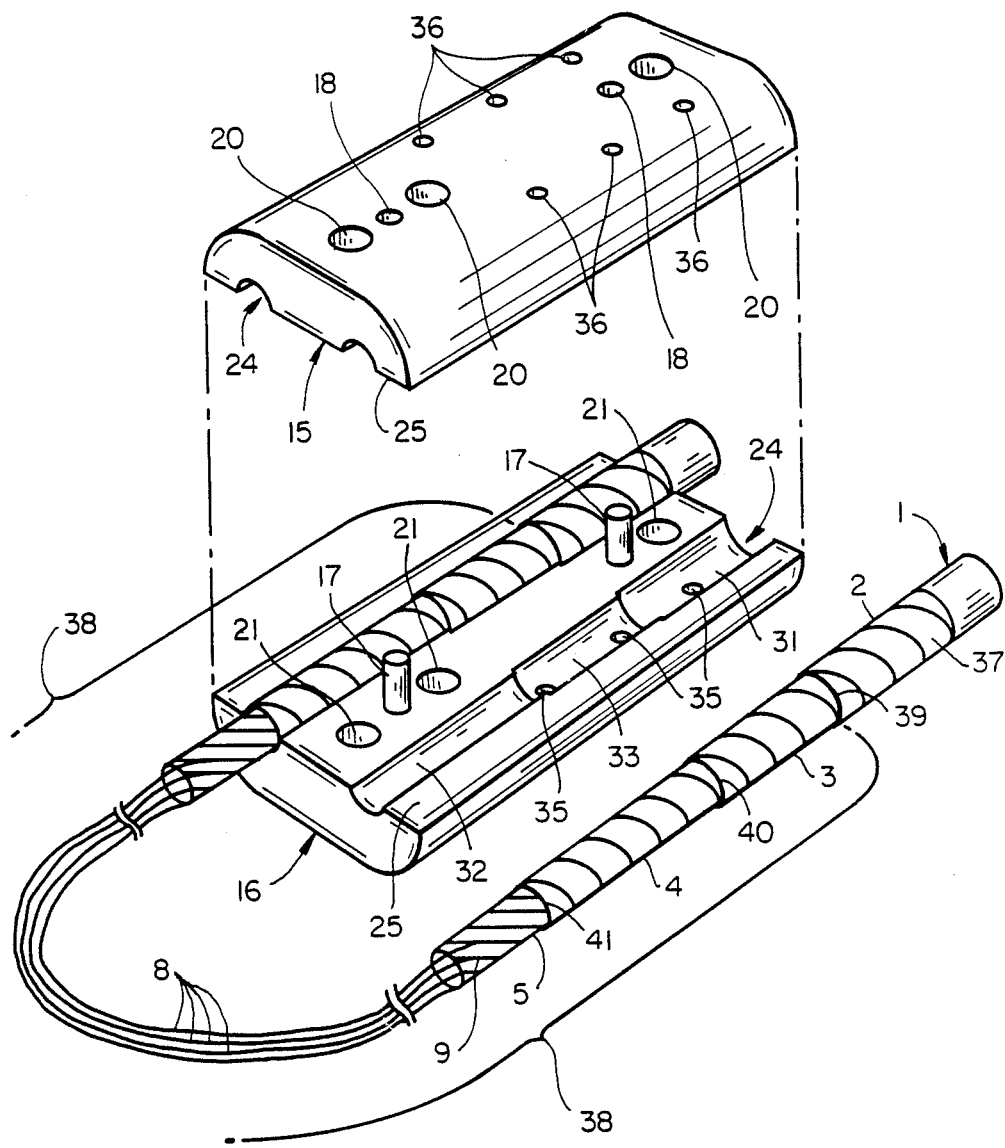
FIG_1

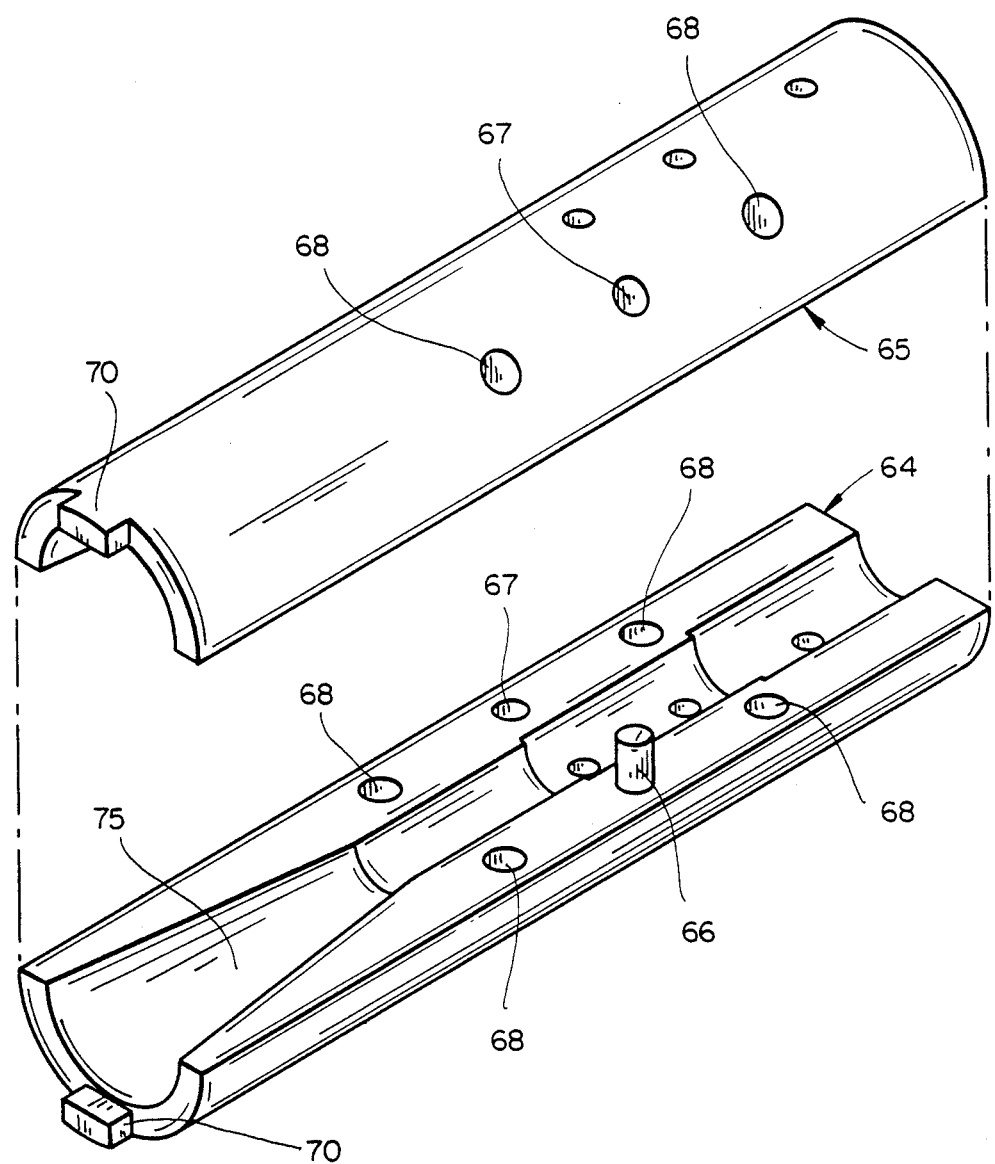
FIG_2

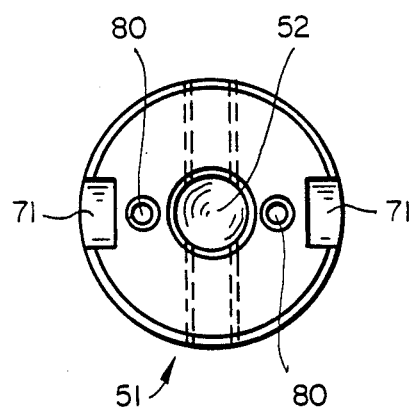
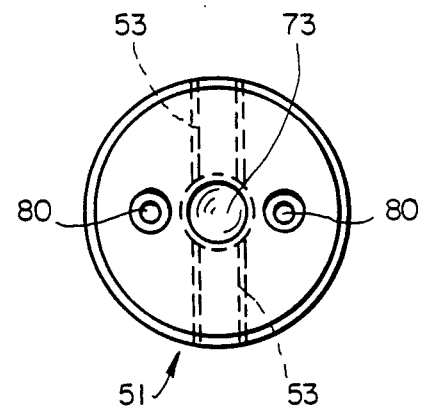
FIG_3a   FIG_3c
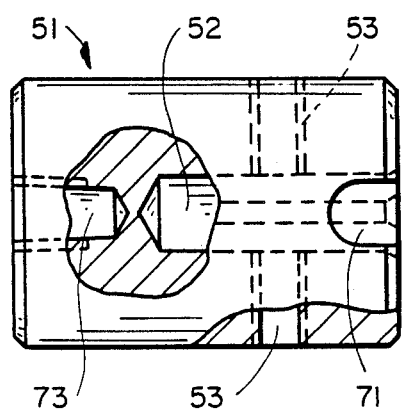
FIG_3b

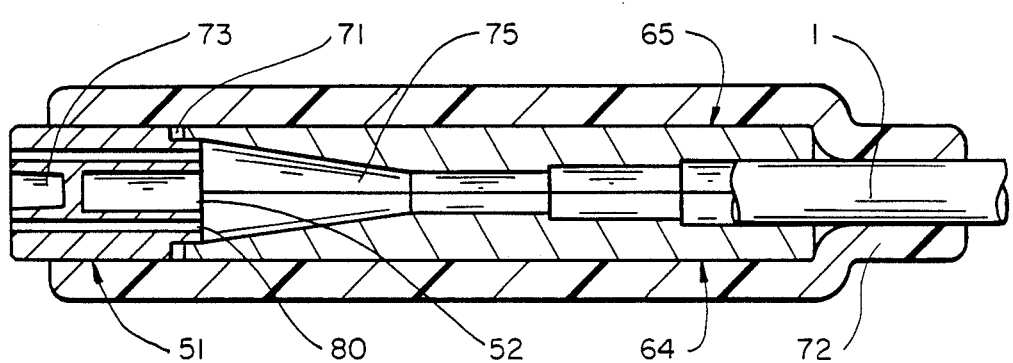
FIG_4
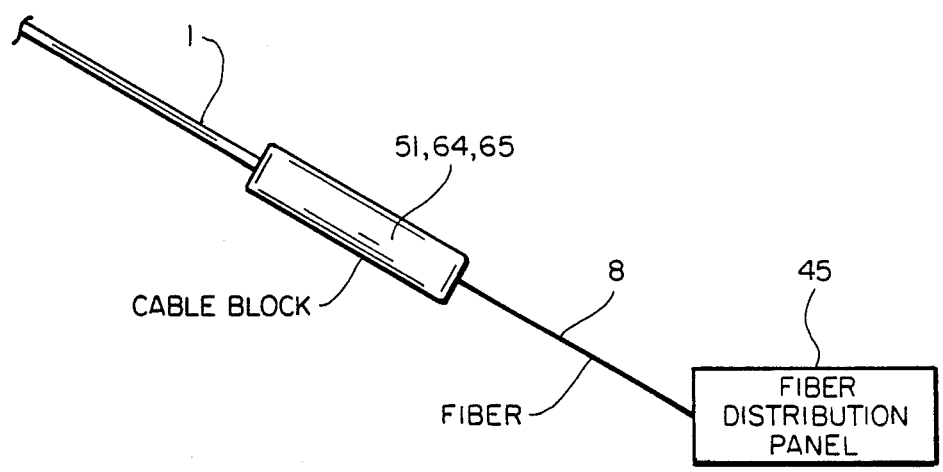
FIG_5

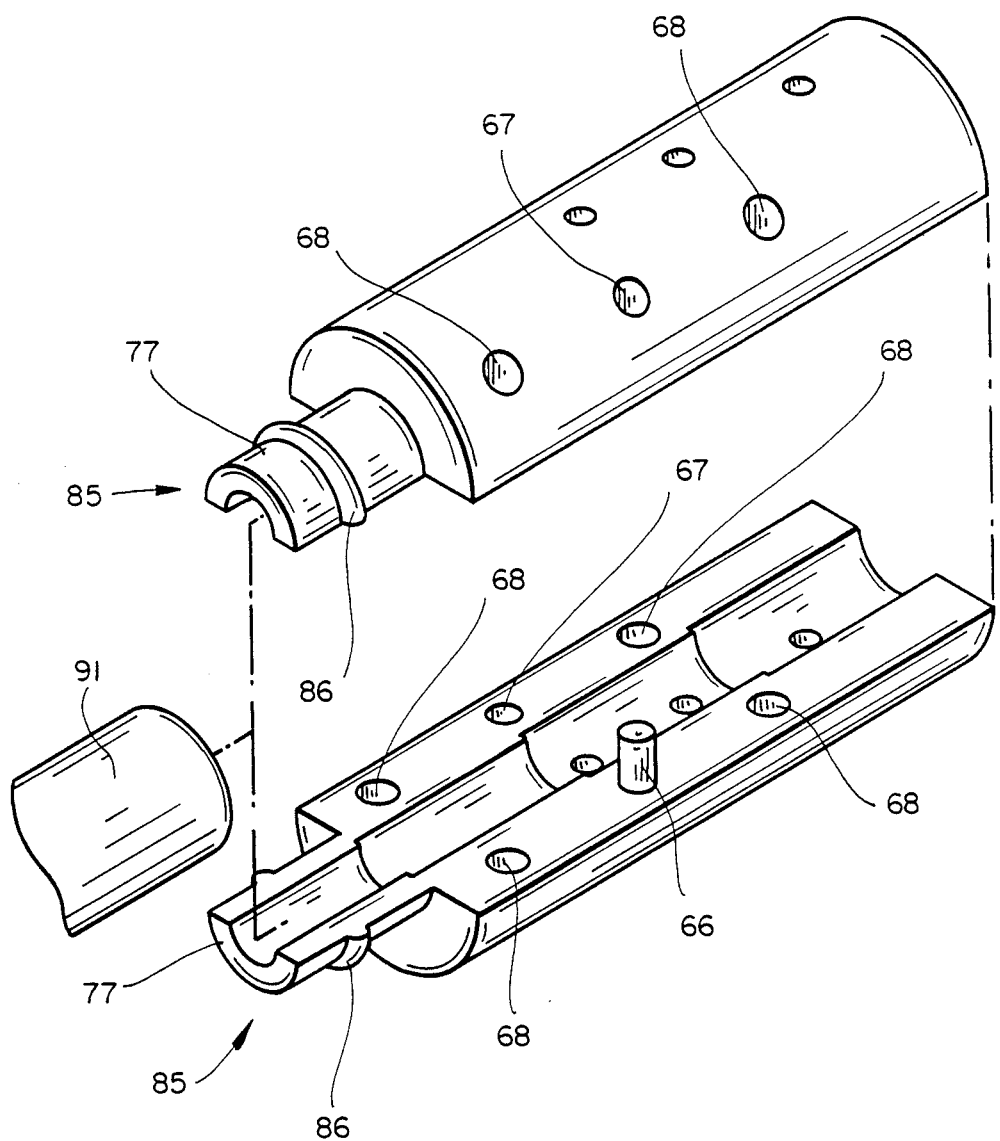
FIG_6

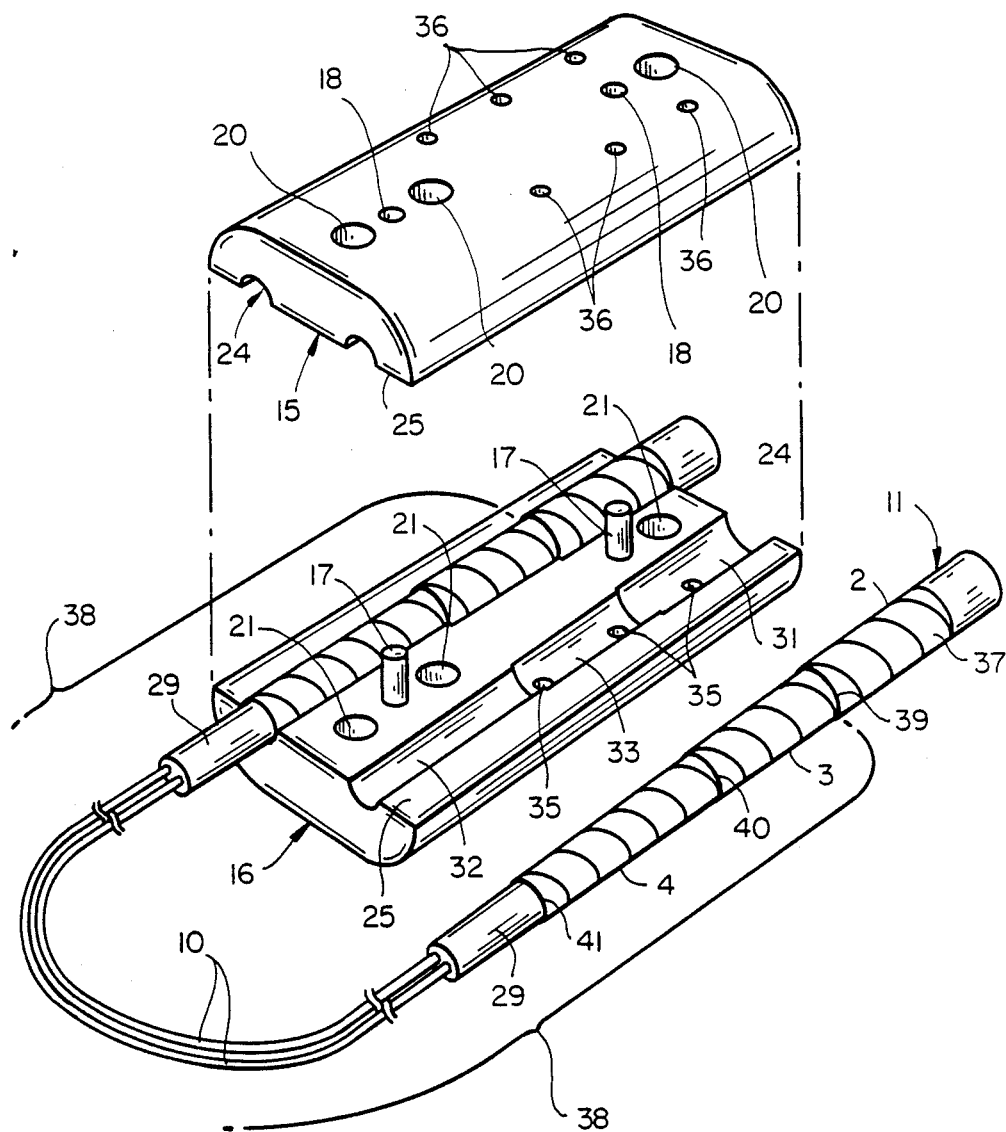
FIG_7

STEPPED CABLE BLOCK

BACKGROUND OF THE INVENTION

The present invention relates to a cable block optimally designed for providing an environmental block for communication cable, e.g. optical fiber cable or electrical cable, having an intermediate section or end section thereof stripped away so as to be accessible to optical fibers or electrical wires therewithin.

Optical fiber networks are widely preferred over networks utilizing electrical conduction medium due to the increased bandwidth of optical fibers and the immunity of optical fiber to EMI and RFI effects. Though various optical fiber networks have been proposed, problems exist in accessing optical fibers within optical fiber cables in an environmentally safe manner so as to preclude environmental contaminants, such as water, from contaminating inner portions of the optical fiber cable including the optical fibers contained therewithin as well as various electrooptical components and circuitry associated with the fiber. Similar problems exist for electrical cable.

Accordingly, there is a continuing need for user friendly articles for sealingly terminating communication cables, e.g. optical fiber cables and electrical cables.

SUMMARY OF THE INVENTION WITH OBJECTS

It is an object of the present invention to provide an improved environmental seal for telecommunications cable, e.g. optical fiber or electrical cable.

It is a further object to provide a water cable block for an optical fiber cable for which an intermediate section thereof is to be entered so as to expose both inner layers of the cable and optical fibers or tubes containing same therewithin.

It is yet a further object to provide a water cable block for a cable at a end section thereof for easy termination.

This and other objects of the invention are achieved by a telecommunications cable block for a telecommunications cable, comprising:

a telecommunications cable having a first portion thereof stripped of its outer and inner sheathes so as to expose a relatively short section of the inner sheath along a section of the cable and so as to expose a length of telecommunication transporting media protected by the cable;

first and second engageable and disengageable members, the members when engaged forming at least a first stepped substantially cylindrical channel having first and second longitudinal portions with at least one step therebetween, the short section of the inner sheath being disposed in the first channel portion, a short section of the outer sheath being disposed in the second channel portion; and means for compressingly urging the first and second members together so as to sealingly engage the inner and outer sheathes in the first and second channel portions, respectively.

BRIEF DESCRIPTION OF THE DRAWINGS

FIG. 1 illustrates a first preferred embodiment of the invention associated with a slotted core optical fiber cable having an intermediate section to be entered;

FIG. 2 illustrates a second preferred embodiment of the invention for a cable having an end or part of an intermediate section to be terminated;

FIGS. 3a–3c illustrate a member optionally useable in combination with the embodiment of FIG. 2;

FIG. 4 illustrates an assembly of members shown in FIGS. 2 and 3 about a cable end;

FIG. 5 illustrates one preferred application of the assembly of FIG. 4;

FIG. 6 illustrates another embodiment of the invention preferably for environmentally sealing a loose tube optical fiber cable; and FIG. 7 is similar to FIG. 1 except that a loose tube fiber cable is shown.

DESCRIPTION OF THE PREFERRED EMBODIMENTS

FIG. 1 illustrates a first preferred embodiment of the invention for providing an environmental block for a cable, preferably a loose tube or slotted core optical fiber cable, a slotted core cable 1 being shown in this figure. Referring to FIG. 1, the optical fiber cable 1 has an outer sheath 2 surrounding a metal grounding shield 3 which in turn surrounds an inner sheath 4 which surrounds a slotted core 5 having helical grooves 9 on an outer surface thereof which guide a plurality of optical fibers 8 in the grooves.

FIG. 7 illustrates a similar optical fiber cable 11 having a similar outer sheath, metallic shield, inner sheath construction except that the cable 11 in FIG. 7 is of the loose tube type wherein instead of the slotted core 5 the cable surrounds a plurality of loose tubes 10, with a plurality of optical fibers optimally being contained within each individual tube 10. Accordingly, it is tubes, rather than optical fibers, which are exposed when the various cable layers are stripped away and individually sealed as explained below.

According to both the embodiments of FIGS. 1 and 7, the cable 1, 11 is blocked by utilizing first and second half shell members 15, 16 which are engageable by aligning alignment pins 17 with alignment holes 18 and interengaging same. The half shell members are secured together utilizing bolts and nuts, or screws, which interengage the members through mating holes 20, 21. Each half shell member preferably has two longitudinally oriented stepped semicylindrical channels 24 therein which extend from a substantially planar face 25. The faces 25 mate and sealingly engage with each other and form a seal therebetween as described in more detail below. Each channel 24 optimally has a plurality of stepped channel portions, one portion for each cable layer to be successively sealed so as to form a water block regardless of which layer boundary may be contaminated and having a water flow longitudinally down the cable. The embodiment of FIG. 1 illustrates three stepped substantially semicylindrical channel portions 31, 32, 33, again the precise number of channels being determined by the number of cable layers to which a seal is required. Finally, a plurality of electrical grounding pins 35 extend into one or more of the channel portions 31–33 radially a depth sufficient so as to make electrical contact with the metallic cable shield 3, and optimally an electrical lead wire (not shown) extends from a surface, e.g. back surface away from an optical fiber breakout portion of the cable, from the half shell members. The lead wire is preferably connected to an appropriate grounding medium. This construction safely protects the optical fiber cable (or other kinds of cable) from lightening strikes and other types of current surges. Preferably, an environmental sealing tape 37 is helically wound around those portions of an outer surface of the cable which are to be environmentally sealed by the half shell members 15, 16. Preferably, the tap 37 is gel impregnated and has thereon and therein a relatively soft elastic gel whose cone penetration is between 100 and 350 ($10^{-1}$ mm) and has an ultimate elongation of at least 100%, such gels and tapes being more fully described in U.S. Pat. Nos. 4,600,261; 4,634,207; 4,643,924; and 4,650,228, the disclosures all of which are incorporated herein by reference.

To environmentally seal and block an intermediate portion of an optical fiber, its outer sheath 2 is first removed along an intermediate length 38 of the cable 1 thus exposing the metallic shield 3 and forming two steps 39 in the intermediate section of the optical fiber cable. Next, the metallic shield 3 is removed along a second intermediate section of the optical fiber which is collinear with but shorter than the first section 38 thus leaving only a relatively short length of the metallic shield 3 exposed and thus forming a second step 40 and exposing the cable inner sheath. Similarly, an intermediate portion of the exposed cable inner sheath is removed along a third section of the optical fiber which is collinear with the first and second sections except again shorter than both the first and second sections so as to result in a short portion of the inner cable sheath 4 being exposed and thus forming a third step 41 from which extends the slotted core 5 of the cable. Subsequently, an intermediate section of the exposed slotted core is removed which again is collinear with but shorter than the third section thus leaving the optical fibers 8 free and accessible along a substantial intermediate length thereof. Optionally, the exact length of the exposed metallic shield 3 and inner sheath 4 is matched to the extent practical to a length of its corresponding channel portion 33, 32 respectively.

Next, preferably the entire length of the various layered cable sections thus exposed and to be seated in the channel portions 31-33 is wrapped with the gel impregnated tape 37 in a helical fashion, as illustrated in FIG. 1, and the layered and stripped cable at opposite sides of the fiber breakout portion is inserted into the semicylindrical channels 24 in the first and second half shell members as illustrated in FIG. 1, and the half shell members are assembled using the alignment pins 17 and holes 18 and then secured together by utilizing bolts or other similar means in mating holes 20, 21. Preferably, an inside diameter of each stepped channel portion 31, 32, 33 is only slightly larger than an outside diameter of each stepped cable portion 2, 3, 4 such that subsequent to wrapping the stepped cable portion with the gel impregnated tape the overall diameter of the cable plus tape is slightly larger than the insider diameter of the channel portions. Accordingly, when the half shell members are assembled as described, the gel is placed under a compressive load and is elastically resiliently urged around and within surfaces it contacts with a small amount of gel and/or gel tape being compressively urged and displaced between the mating faces 25 of the half shell members 15, 16 so as to form an excellent environmental cable barrier.

The construction of FIG. 7 is quite similar to that of FIG. 1 except that in FIG. 7 the optical fiber cable 1 has been replaced with an optical fiber cable 11 which is of the loose tube type wherein the major difference in the cable construction is the lack of a slotted core. Hence subsequent to removing the inner sheath 4 one or more plurality of loose tubes are finally exposed from an innermost cable core 29, with individual optical fibers 8 being contained within the hollow tubes 10. Portions of intermediate sections of the tubes 10 can then be removed as necessary to access individual optical fibers 8. In all other respects, the cable block of FIG. 7 is functionally and operationally the same as that of FIG. 1.

The cable block as described by reference to FIGS. 1 and 4 forms an excellent water block for an optical fiber cable having an intermediate section thereof which is to be entered so as to access optical fibers in the cable, preferably for optically coupling therewith using passive noninvasive couplers of the type described in any of U.S. Pat. Nos. 4,728,169; 4,741,585; 4,824,199; and U.S. application Ser. No. 252,915 filed Sept. 30, 1988 now abandoned, and U.S. application Ser. No. 383,828 filed Jul. 21, 1989 still pending the disclosures of which are all incorporated herein by reference. With the optical fiber cable suitably environmentally blocked, any type of conventional closure, such as that disclosed in U.S. application Ser. No. 262,067 filed Oct. 24, 1988, now U.S. Pat. No. 4,913,522 the disclosure of which is incorporated herein by reference, can be utilized for forming environmental seals around an exterior portion of the half shells 15, 16 and any electrical and/or power cables which are also required to enter the housing or exit therefrom.

In addition to environmentally isolating and protecting the intermediate portion of an optical fiber at a location where it is desirable to tap intermediate sections of one or more optical fibers passively and noninvasively as previously described, the invention is further useful for environmentally blocking and protecting an end segment of an optical fiber cable such as can occur at an end termination, such as at an office interface unit where termination of optical fibers ultimately is to be made at a fiber distribution panel 45 as illustrated in FIG. 5. A further preferred embodiment of the invention utilizes a member which again comprises mating first and second half shell members 64, 65 but which together form only one interior stepped longitudinal channel since it is only an end of the cable which is to be sealed, as shown in FIG. 2. Each half shell member 64, 65 contains a pin 66 which engages a mating hole 67 on the other member so as to correctly seat the half shell members 64, 65 together, and they are secured thereto, like in the embodiment of FIG. 1, with bolts or screws which extend through securing holes 68 with a substantially cylindrical shaped stepped channel being formed therebetween which tightly engages a gel wrapped stripped stepped cable (not shown in FIG. 2). For terminating a slotted core optical fiber cable, it has been found advantageous to complement the design of FIG. 2 with a further member as illustrated in FIGS. 3a-3c.

Specifically, member 51 in FIG. 3 has a central longitudinal and substantially cylindrical channel 52 which extends longitudinally part way through the member 51 and which receives an end portion of the exposed cable slotted core 5 and is securely attached thereto by set screws (not shown) which radially are inserted through the member 51 in holes 53 illustrated in FIG. 3b. Optimally, the member 51 is useable with first and second half shell members 64, 65 which have a similar construction to that of half shell members 15, 16 except that together the half shell members 64, 65 form only a single longitudinal stepped substantially cylindrical bore, as previously explained. An end of the half shell members 64, 65 preferably has extensions, e.g. pins 70, protruding therefrom longitudinally which align with and mate with corresponding holes 71 at an end of the member 51. Optionally, a side 75 of the members 64, 65 where the exposed slotted core and fibers of the cable exit has an enlarging conical design as illustrated. With this construction, the member 51 can easily be attached to the half shell members 64, 65, as illustrated in FIG. 4 (which shows only part of the terminated cable), and the entire assembly, e.g. the members 51, 64, 65, and a portion of an unstripped cable entering into the half shell 64, 65 can be environmentally surrounded and protected by a heat shrinkable recoverable sleeve 72.

During asembly, the optical fibers exposed by the exposed slotted core are lead through one or more conduits 80 extending longitudinally all the way through the member 51. With this construction, side forces on the optical fibers are positively prevented which drastically minimize any chance that the fibers will accidentally be broken as they are being handled as could occur when being secured to a fiber distribution panel 45 as illustrated in FIG. 5. FIG. 3b further shows a cylindrical bore extending partially from an end face of the member 51 from a side opposite that of the bore 52 which accommodates the exposed portion of the slotted core, this element being identified by reference numeral 73.

In the case where an end of an optical fiber cable is to be terminated which is of the loose tube type, FIG. 6 illustrates a preferred construction whereby first and second half shell members having a structure similar to that illustrated in FIG. 2 is shown except that one end 85 of the half shells has a substantially reduced diameter section 77 through which loose tubes of the cable extend.

A ridge 86 also extends upward from an outside surface of the reduced diameter section 77. With this construction, the loose tubes containing optical fibers simply extend through the reduced diameter section 77, and to provide further environmental protection optionally a further tube 91 can be disposed over an exterior portion of the reduced section 77 and held thereon by the ridge 86 so as to further protect the loose tubes and the fibers contained therewithin. The tube 91 has a longitudinal channel therein and can optimally be slid over the exterior part of the one end 85 of the half shells and be secured thereto by the ridge 86 by a resilient tight fit. More specifically, the tube 91 can be made of a resilient rubber having a diameter substantially similar to that of the one end 85 so as to have to be stretched over the ridge 86 so as to form a friction fit therebetween.

Though the invention has been described by reference to certain preferred embodiments thereof, the invention is not to be limited thereby and only by the appended claims.

We claim:

1. A telecommunications cable block for a telecommunications cable, comprising:

a telecommunications cable having a first portion thereof stripped of its outer and inner sheathes so as to expose a relatively short section of the inner sheath along a section of the cable and so as to expose a length of telecommunication transporting media protected by the cable;

first and second engageable and disengageable members, the members when engaged forming at least a first stepped substantially cylindrical channel having first and second longitudinal portions with at least one step therebetween, the short section of the inner sheath being disposed in the first channel portion, a short section of the outer sheath being disposed in the second channel portion; and means for compressingly urging the first and second members together so as to sealingly engage the inner and outer sheathes in the first and second channel portions, respectively.

2. The cable block of claim 1, further comprising a relatively soft elastic gel tape, the tape being impregnated with a gel having a cone penetration between 100 and 350 ($10^{-1}$ mm) and an ultimate elongation greater than at least 100%, the gel tape being wrapped around the cable so as to contact both an inner surface of the cylindrical channel and an outer surface of the cable around a 360° circumference.

3. The cable block of claim 2, the cable portion being stripped so as to expose a relatively short section of a cable metallic shield between an end of an unstripped part of the outer sheath and the exposed relatively short section of the inner sheath, the exposed metallic shield being disposed in a third channel portion which is between and adjacent to the first and second channel portions and separated therefrom by steps, a length of the third channel portion being substantially similar to a length of the exposed metallic shield, the first and second channel portions being substantially occupied along a length thereof by the exposed inner sheath and the outer sheath, respectively.

4. The cable block of claim 3, the gel being disposed in all three channel portions.

5. The cable block of claim 4, the cable comprising a slotted core optical fiber cable or a loose tube optical fiber cable.

6. The cable block of claim 4, further comprising means for electrically connecting to the metallic shield, the connecting means being disposed within the third channel portion so as to be capable of conducting electricity therefrom and away from the first and second members to an electrical ground.

7. The cable block of claim 6, the first and second members comprising half shell members each of which has a semicylindrical step longitudinal channel therein which together form the stepped substantially cylindrical channel when the first and second members are engaged, the members including mating aligning pins and holes aligning the members together to facilitate engagement thereof.

8. The cable block of claim 7, further comprising a third member having an end mateable to an end of the first and second members, the first, second; and third members having means for aligning their respective ends together, the third member having a first longitudinal channel extending only partially longitudinally therethrough.

9. The cable block of claim 8, the third member first longitudinal channel accommodating a short section of an exposed slotted core of an optical fiber cable which extends from an end of the exposed inner cable sheath, the third member containing at least one second longitudinal channel extending substantially parallel to its first longitudinal channel for housing optical fibers emanating from an exterior surface of the slotted core.

10. The cable block of claim 9, the third member having at least one radially extending channel therein which extends into an intermediate length of the third member first channel, and further comprising means disposed within the radially extending channel for securing the third member to the slotted core.

11. The cable block of claim 8, further comprising a protective sleeve disposed over an exterior surface of at least a part of the third member, over a complete outer surface of the first and second members, and over part of an unstripped part of the cable outer sheath.

12. The cable block of claim 6, the first and second members together forming an exit channel for a plurality of loose tubes contained within the cable which are exposed after the cable is stripped, an outer circumferential surface of the exit channel having a circumferential ridge therearound for holding a tubular member onto an outer surface of the exit channel.

13. The cable block of claim 6, the members when engaged forming a second stepped longitudinal channel having a construction substantially similar to that of the first channel and for accommodating and sealing a second stripped cable portion having a structure substantially similar to the first stripped cable portion but placed longitudinally along the cable therefrom, the telecommunications conducting media being exposed for easy access between the first and second stripped cable portions.

14. The cable block of claim 1, the members when engaged forming a second stepped longitudinal channel having a construction substantially similar to that of the first channel and for accommodating and sealing a second stripped cable portion having a structure substantially similar to the first stripped cable portion but displaced longitudinally along the cable therefrom, the telecommunications conducting media being exposed for easy access between the first and second stripped cable portions.

15. An optical fiber cable block for an optical fiber containing optical fibers therein, comprising:
an optical fiber cable having at least an outer sheath and an inner sheath and at least one optical fiber disposed therewithin, a first section of the cable having a longitudinal length of the outer sheath removed therefrom so as to expose at least one inner cable sheath therebeneath along a second cable section which is shorter than the first cable section and collinear therewith;
first and second engagable and disengagable half shell members, each half shell member containing at least one longitudinal stepped semicylindrical channel therein disposed so as to extend from a surface of each member which are engageable with each other, the members when engaged forming at least one longitudinal stepped cylindrical channel therein, first and second longitudinal portions of the channel having step diameters having a size similar to that of the cable outer and inner sheath respectively, the first and second half shell members being disposed around the cable such that a first length of the exposed inner sheath is disposed within the first channel portion and an unstripped portion of the cable is disposed within the second channel portion, the inner sheath first length being shorter than the second cable section;
means for compressingly urging the first and second half shell members together so as to sealingly engage the inner and the outer sheaths in the first and second channel portions respectively.

16. The cable block of claim 15, an intermediate length of the inner cable sheath being removed along a third cable section which is collinear with but shorter than the second cable section.

17. The cable block of claim 16, the first and second channel portions being disposed on opposite ends of the half shell members.

18. The cable block of claim 17, further comprising a relatively soft elastic gel tape, the tape being impregnated with a gel having a cone penetration between 100 and 350 ($10^{-1}$ mm) and an ultimate elongation greater than at least 100%, the gel tape being wrapped around the cable so as to contact both an inner surface of the cylindrical channel and an outer surface of the cable around a 360° circumference.

19. The cable block of claim 17, the cable including a metallic shield between the inner and outer sheaths, an intermediate length of the metallic shield being removed along a fourth cable section which is collinear with but shorter than the first cable section and longer than the second cable section, the longitudinal stepped channel having a third longitudinal portion disposed between the first and second channel portions, an intermediate length of the shield which is exposed being disposed within the third longitudinal channel portion.

20. The cable block of claim 19, further comprising means for electrically connecting to the metallic shield, the connecting means being disposed within the third channel portion so as to be capable of conducting electricity therefrom and away from the first and second half shell members.

21. The cable block of claim 20, the electrical connecting means comprising a plurality of thin elongaged members which extend radially through at least a part of one of the half shell members so as to have an end terminating within the third channel portion for electrically contacting the metallic shield, an opposite end of the elongated members being electrically connected to an electrical ground.

* * * * *